(12) United States Patent
Janetzke

(10) Patent No.: US 9,103,230 B2
(45) Date of Patent: Aug. 11, 2015

(54) APPARATUS AND METHOD FOR THE CREATION OF AN IMPINGEMENT JET GENERATING ANNULAR SWIRLS AS WELL AS TURBOMACHINE WITH AN APPARATUS OF THIS TYPE

(75) Inventor: Timm Janetzke, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 594 days.

(21) Appl. No.: 13/532,990

(22) Filed: Jun. 26, 2012

(65) Prior Publication Data

US 2012/0325354 A1 Dec. 27, 2012

(30) Foreign Application Priority Data

Jun. 27, 2011 (DE) .......................... 10 2011 078 138

(51) Int. Cl.
*F15C 1/16* (2006.01)
*F01D 25/12* (2006.01)

(52) U.S. Cl.
CPC ............... *F01D 25/12* (2013.01); *Y02T 50/675* (2013.01); *Y10T 137/2087* (2015.04)

(58) Field of Classification Search
CPC .................................. F01D 26/12; F01D 2/125
USPC ........................ 415/115, 116; 416/96 R, 97 R
See application file for complete search history.

(56) References Cited

U.S. PATENT DOCUMENTS

| 3,326,227 | A |   | 6/1967 | Mitchell |
|---|---|---|---|---|
| 3,434,487 | A | * | 3/1969 | Bauer ........................... 137/835 |
| 5,190,099 | A | * | 3/1993 | Mon ......................... 165/104.33 |
| 6,053,203 | A |   | 4/2000 | Sailor et al. |
| 7,128,082 | B1 | * | 10/2006 | Cerretelli et al. ................ 137/14 |
| 7,665,962 | B1 | * | 2/2010 | Liang ......................... 415/173.1 |

(Continued)

FOREIGN PATENT DOCUMENTS

| CH | 420682 | 3/1967 |
|---|---|---|
| DE | 102007008319 | 8/2008 |

OTHER PUBLICATIONS

Hofmann, 2005, Wärmeübergang beim pulsierenden Prallstrahl, Dissertation, Universitat Karlsruhe, Universitätsverlag Karlsruhe.

(Continued)

*Primary Examiner* — Nathaniel Wiehe
*Assistant Examiner* — Woody A Lee, Jr.
(74) *Attorney, Agent, or Firm* — Timothy J. Kilma; Shuttleworth & Ingersoll, PLC

(57) ABSTRACT

An apparatus for the creation of an impingement jet generating annular swirls includes a fluidic switching element having an inlet branch with an inlet opening via which cooling gas can be supplied to the fluidic switching element, outlet branches provided downstream of the inlet branch and ending each in an outlet opening, a branching point at which the inlet branch splits into the outlet branches, and control means for controlling the cooling gas flowing in the inlet branch such that the cooling gas is routed alternatingly into the one or the other of the outlet branches, with an impingement jet pulsating at a frequency being generated in each outlet branch. The fluidic switching element is designed and provided for emitting cooling gas at the outlet openings with a mean outflow velocity and a frequency such that the impingement jet exiting the outlet openings forms annular swirls.

15 Claims, 4 Drawing Sheets

(56) References Cited

Figure 1:
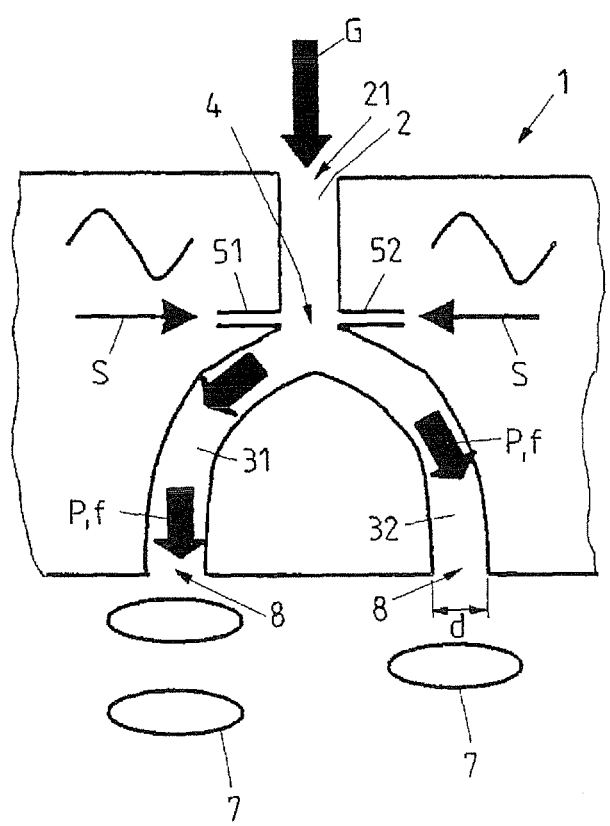

U.S. PATENT DOCUMENTS 8,152,463 B2 * 4/2012 Haselbach et al. ........ 416/1
2010/0123031 A1 * 5/2010 Weber .................. 239/589.1

OTHER PUBLICATIONS

Sheriff, H.S.; Zumbrunnen, D.A., 1994, Effect of Flow-Pulsations on the Cooling Effectiveness of an Impinging Jet, Journal of Heat Transfer, 116, 886-895.

Janetzke: "Experimentelle Untersuchungen zur Effizienzsteigerung von Prallkühlkonfigu¬rationen durch dynamische Ringwirbel holier Amplitude", thesis TU-Berlin, 2010, Mensch und Buch Verlag (publishers).

Herwig at al., 2004, "Wärmeübergang bei instationären Prallstrahlen", Chemie Ingenieur Technik, 76(2), 84-88.

Kirshner, 1966, Fluid Amplifiers, McGraw-Hill, pp. 193 to 203.

* cited by examiner

APPARATUS AND METHOD FOR THE CREATION OF AN IMPINGEMENT JET GENERATING ANNULAR SWIRLS AS WELL AS TURBOMACHINE WITH AN APPARATUS OF THIS TYPE

This application claims priority to German Patent Application DE102011078138.2 filed Jun. 27, 2011, the entirety of which is incorporated by reference herein.

It is generally known to provide impingement cooling for the cooling of the components of a turbomachine. Appropriate impingement cooling configurations subject a component or surface to be cooled to cooling air, where said cooling air or another fluid from a nozzle impinges on a surface to be cooled. Impingement cooling configurations used in turbomachines are operated with stationary impingement jets providing a stationary supply of cooling air.

It is known from DE 10 2007 008 319 A1 to provide impingement cooling while achieving a pulsating supply of cooling air. It was proven in Janetzke: "Experimentelle Untersuchungen zur Effizienzsteigerung von Prallkühlkonfigurationen durch dynamische Ringwirbel hoher Amplitude", thesis TU-Berlin, 2010, Mensch und Buch Verlag (publishers), that considerable increases in cooling effectivity can be obtained by a pulsating supply of cooling air, with a corresponding savings potential for cooling air mass flow. This is linked to the fact that a pulsating cooling air supply generates annular swirls, depending on the pulsation frequency and the pulsation amplitude, said swirls containing cooling fluid in their core and transporting it from the nozzle outlet to the impingement plate to be cooled. There the periodic occurrence of annular swirls leads to a periodic renewal of the fluid and temperature boundary layer. Depending on the swirl frequency and amplitude or on the swirl intensity resulting from these values, this can lead to reductions or increases of the convective heat transfer.

To create annular swirl structures that considerably increase the effectivity of impingement cooling, a certain ratio between the frequency f of the pulsating cooling air supply, the mean nozzle outflow velocity u and the diameter of the outlet opening emitting the impingement jet has proven to be advantageous.

These three parameters are linked as follows using the Strouhal number Sr, a dimensionless frequency:

$$Sr = f*d/u.$$

It has become clear that a Strouhal number of Sr=0.26 forms the lower limit for an increase in the heat transfer. Ideally, Strouhal numbers are in the range between Sr=0.8 and 1.2, so that annular swirl structures with high cooling efficiency can be created.

The result is thus that a pulsating cooling air supply with generation of annular swirls makes possible a considerably improved impingement cooling efficiency. This however raises the problem of how in the case of turbomachines, for example thermally highly loaded turbine components of a jet engine, pulsation of the cooling air can be assured at the high amplitudes and high frequencies necessary to achieve effective Strouhal numbers.

To date, pulsating impingement cooling configurations have only been tested in the laboratory. In laboratory tests, the pulsation is usually generated by active actuators, for example valves or siren-like components. Furthermore, additional resonators are sometimes used for generating the necessary high amplitudes. Although the active pulse generators used in laboratory tests attain the necessary high amplitude and frequency, they are ill-suited for use in a turbomachine due to their size, their additional weight and their complexity.

A particular problem from the technical viewpoint is the combination of the required high frequency resulting from the high outflow velocities of the impingement jet nozzles used in the turbomachine to achieve the aforementioned Strouhal numbers, and the absolutely necessary high amplitude.

It has furthermore been shown that passive methods for pulsation generation using Karman swirl nozzles, for example, are not suitable for generating sufficiently high amplitudes in the targeted Strouhal number range and hence for increasing the convective heat transfer, cf. here Herwig at al., 2004, "Wärmeübergang bei instationären Prallstrahlen", Chemie Ingenieur Technik, 76(2), 84-88.

The object underlying the present invention is therefore to provide an apparatus permitting the provision of pulsating impingement jets in the Strouhal number range between Sr=0.2 and 2 and with high amplitude, where said apparatus should be suitable to be used for impingement cooling in turbomachines.

The present invention provides an apparatus with the features described herein, a turbomachine with the features described herein as well as a method with the features described herein. Embodiments of the present invention become apparent from the description below.

In accordance with a first aspect of the invention, at least one fluidic switching element is therefore provided to create an impingement jet generating annular swirls, said element having an inlet branch and, downstream of the latter, at least two outlet branches. Control means are provided which control the cooling gas flowing in the inlet branch at a branching point such that the cooling gas is routed into only one of the outlet branches. The cooling gas is here alternatingly routed into the one or the other of the outlet branches. In each outlet branch, a pulsating impingement jet with a frequency f is generated in this way. This fluidic switching element is designed such that cooling gas can be emitted at the outlet openings of the outlet branches with a mean outflow velocity and with a frequency such that the impingement jet exiting the outlet openings forms annular swirls.

The solution in accordance with the invention permits, by the use of a fluidic switching element, generation of annular swirls with a high amplitude at a defined Strouhal number in the range between 0.2 and 2.0, and in a frequency range characteristic for turbomachines, without the incoming main mass flow of the cooling gas needing to be periodically interrupted to do so.

In so doing, the alternating routing of the cooling gas into the two outlet branches of the fluidic switching element provides in the ideal case an amplitude of 100% of the mean outflow velocity, corresponding to an on/off jet. The impingement jets provided at the outlet of the fluidic switching element are thus periodically interrupted. This is achieved in accordance with the invention without an active and expensive interruption mechanism.

In an embodiment of the invention, the control means include a periodically fluctuating controlling mass flow supplied by means of at least one control supply line to the fluidic switching element in the area of the branching point. The controlling mass flow is here smaller than the mass flow of the cooling gas. The control corresponds to that extent to the control of a transistor. Controls of this type are described as regards their mode of operation in Kirshner, 1966, Fluid Amplifiers, McGraw-Hill, pp. 193 to 203.

It is possible to provide here both two-sided control where the controlling mass flow is supplied via two control supply lines to the fluidic switching element in the area of the branching point, and one-sided control where the controlling mass flow is supplied via one control supply line to the fluidic switching element in the area of the branching point. With two-sided control, the fluidic control element is as a rule designed such that the cooling gas flow splits into the two outlet branches without the controlling mass flow. The controlling mass flow subjected to a certain control frequency leads to the cooling gas flow being alternatingly routed into one of the two outlet branches. With one-sided control, the fluidic control element is designed such that the cooling gas flow is routed without the controlling mass flow into one of the two outlet branches and to that extent creates a monostable situation. The controlling mass flow subjected to a certain control frequency leads to the cooling gas flow being diverted for a certain period—depending on the control frequency—to the other of the two outlet branches.

It is pointed out that control of the fluidic switching element by means of a controlling mass flow only represents one exemplary embodiment. Alternatively, the fluidic switching element can also be designed such that it manages without any external control. To do so, the fluidic switching element is for example designed such that it vibrates at a characteristic frequency due to its geometry, possibly in conjunction with internal feedback ducts between outlet ducts and control ducts.

It is provided that the ratio between the frequency f of the pulsating impingement jet, the mean outflow velocity u of the cooling gas from the outlet openings and the diameter d of the outlet openings is such that the Strouhal number Sr formed with these values according to the formula $Sr=f*d/u$ is in the range between 0.2 and 2.0, in particular in the range between 0.6 and 1.4 and preferably in the range between 0.8 and 1.2.

It can be provided that the fluidic switching element is designed in a partition wall arranged at a distance from an impingement wall to be cooled, where the annular swirls formed by the impingement jet impact the impingement wall and cool it with high efficiency. The impingement wall is here arranged on the one side of the partition wall. The fluidic switching element is supplied from the other side of the partition wall with cooling gas, for example via a volume filled with cooling gas.

The fluidic switching element can have in its specific embodiment a plurality of variations. It can for example be provided that the outlet branches of the fluidic switching element are designed curved or straight. The area of the branching point at which the inlet branch splits into at least two outlet branches can also have various embodiments. In one design variant, it is provided to this end that the branching point of the fluidic switching element forms two feedback lobes inside which part of the cooling gas is routed back in the direction of the inlet branch instead of flowing into one of the outlet branches. This facilitates and accelerates switching of the switching element into the other state, allowing higher switching frequencies to be achieved.

In a further embodiment of the invention, it is provided that the apparatus has a plurality of fluidic switching elements arranged in the form of a one- or two-dimensional array. It can be provided here in one design variant that two fluidic switching elements are arranged adjacent to one another and that two outlet branches of these adjacently arranged fluidic switching elements are aligned with one another such that annular swirls with double frequency are present at a defined distance from the fluidic switching elements. The impingement wall is arranged at the defined distance, so that annular swirls from two outlet branches of two switching elements impact an affected wall area such that the latter is subjected to annular swirls with double frequency, with the advantage of a further improved cooling.

In accordance with a second aspect, the invention relates to a turbomachine with an apparatus in accordance with the description herein. The fluidic switching element is here arranged in the turbomachine such that the annular swirls formed by the impingement jet exiting the outlet openings of the fluidic switching element impact a wall or surface of the turbomachine to be cooled.

The turbomachine component is for example a turbine. The wall or surface to be cooled is that of a casing, a casing liner or a turbine blade of the turbine. In one design variant, the surface to be cooled is for example the rear face of an insert ring (also referred to as "liner") arranged in the area of the turbine rotor on the circumference of the turbine casing. The apparatus in accordance with the invention can however also be used for cooling any other structures of a turbomachine having an impingement wall.

In a third aspect, the invention relates to a method for the creation of an impingement jet generating annular swirls. It is provided that cooling gas is supplied in one fluidic switching element alternatingly to at least two outlet branches of the fluidic switching element, where in each outlet branch an impingement jet pulsating at a frequency f is generated and forms annular swirls after leaving the fluidic switching element.

Figure 2:
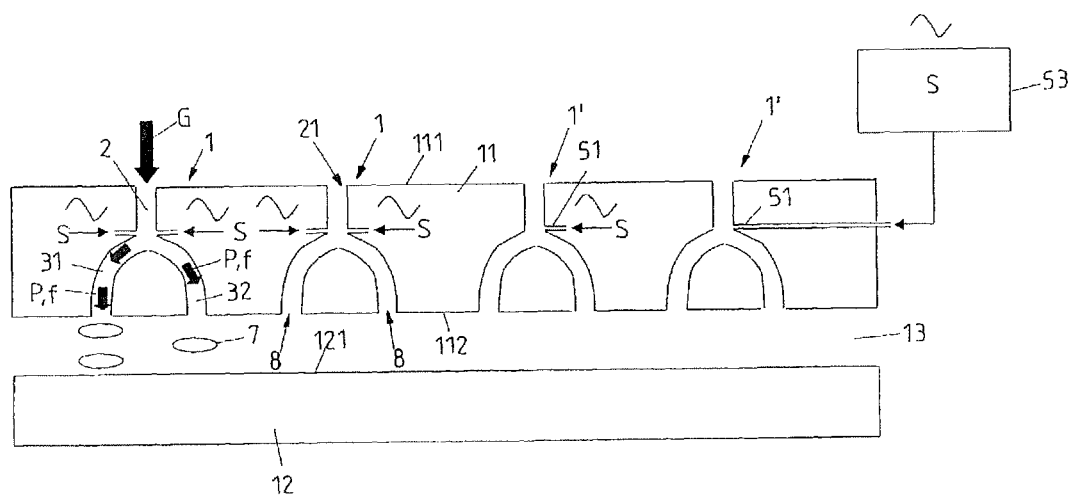
Figure 3:
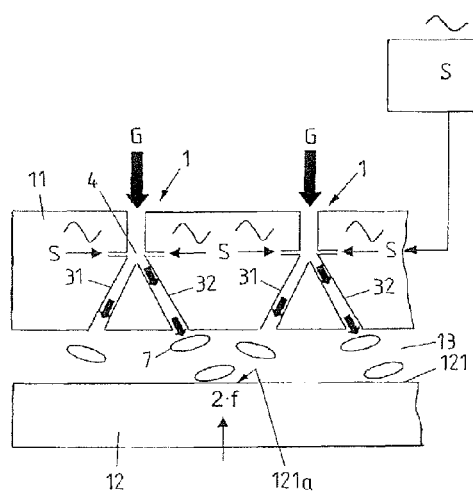
Figure 4:
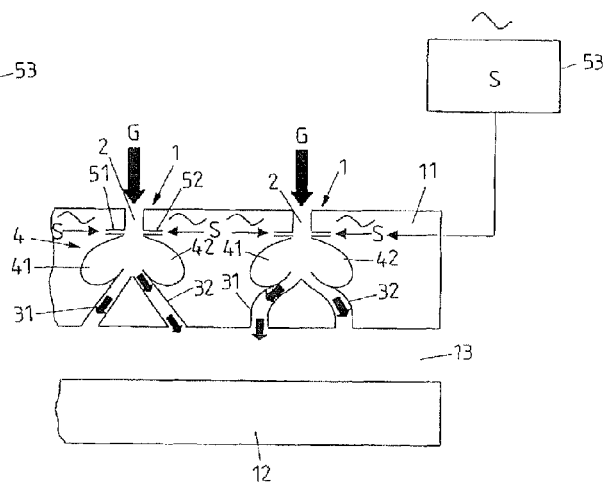
Figure 5:
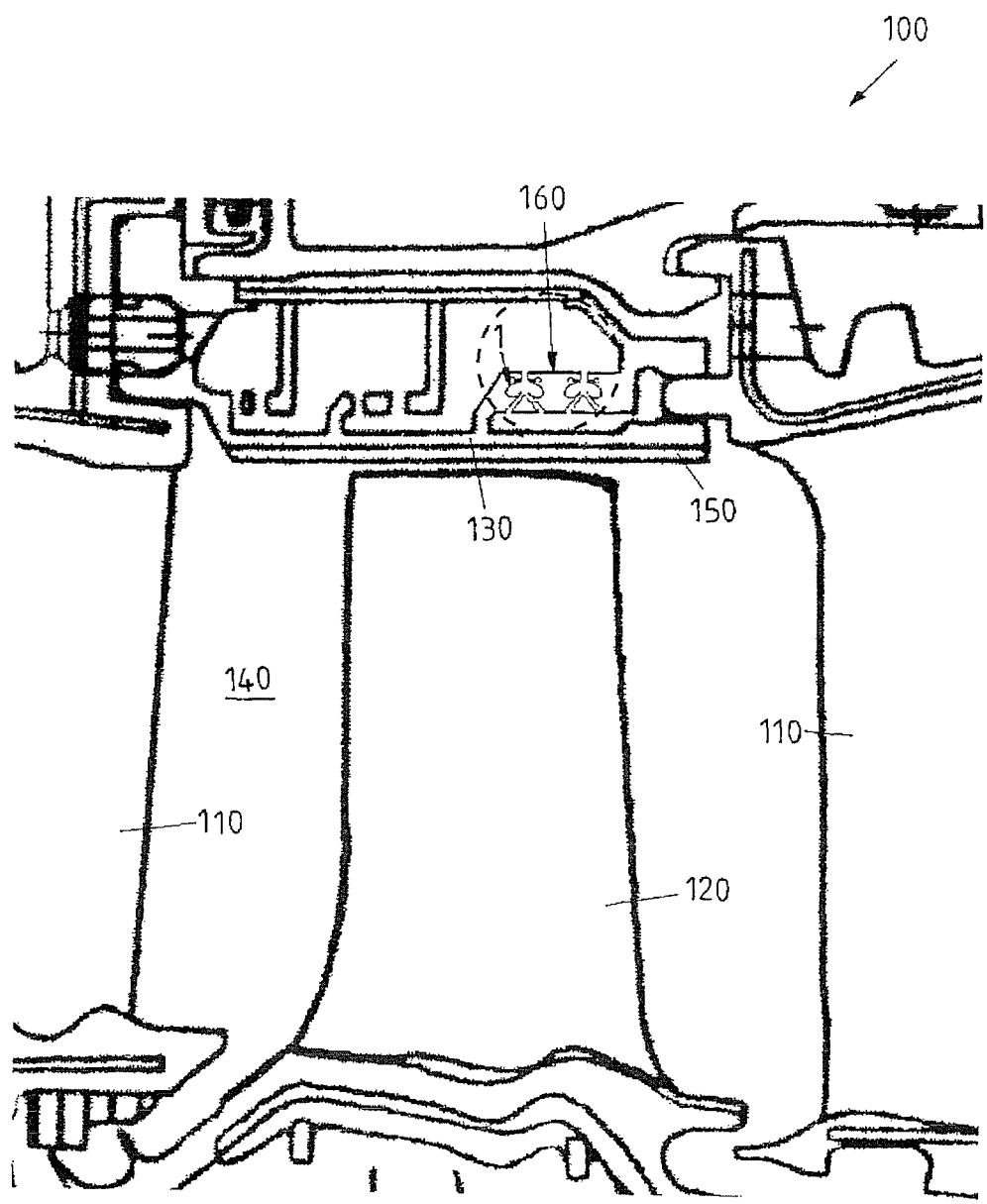

The present invention is more fully described in light of the figures of the accompanying drawing showing several exemplary embodiments. In the drawing, FIG. 1 shows in schematic representation a fluidic switching element for the creation of an impingement jet generating annular swirls, FIG. 2 shows in schematic representation an exemplary embodiment of an impingement cooling configuration using a plurality of fluidic switching elements, FIG. 3 shows in schematic representation a further exemplary embodiment of an impingement cooling configuration using a plurality of fluidic switching elements, with a doubling of the impact frequency of annular swirls between adjacent switching elements being achievable, FIG. 4 shows in schematic representation a further exemplary embodiment of an impingement cooling configuration using a plurality of fluidic switching elements, with the switching elements being designed for achieving high switching frequencies, and FIG. 5 shows a partial view of a turbine of a jet engine, with a casing of the turbine being cooled by means an impingement cooling configuration in accordance with FIGS. 2 to 4.

FIG. 1 shows a fluidic switching element 1 used to create an impingement jet generating annular swirls. The switching element 1 has an inlet branch 2 that splits at a downstream branching point 4 into two outlet branches 31, 32. The inlet branch 2 is supplied at an inlet opening 21 with a cooling gas G which is for example air. To supply the inlet branch 2 with a cooling gas, it is for example provided that above the fluidic switching element 1 a volume is located in which the cooling gas is contained with a defined pressure. Due to this pressure, the cooling gas G flows into the inlet branch 2 of the fluidic switching element 1 at the inlet opening 21. Alternatively, the cooling gas can for example be supplied using a hose connected to the inlet opening.

It is provided that the cooling gas is routed alternatingly into only one of the two outlet branches 31, 32. To achieve this, a control is provided which includes two control supply lines 51, 52 which issue at the level of the branching point 4 into the inlet branch 2 and which are for example designed symmetrical to one another. A controlling mass flow S is provided via the control supply lines 51, 52 which supplies a controlling gas, which can likewise be air, to the area of the branching point 4. The controlling mass flow S is subjected to a defined frequency and amplitude. The controlling mass flow S is here considerably smaller than the main mass flow, which is formed by the flow of the cooling air G through the fluidic switching element.

The periodic fluctuation of the controlling mass flow S can be generated for example by exploiting turbine- or compressor-generated fluctuations, or by separate resonators or generators.

Supplying the control supply lines 51, 52 with a controlling mass flow S of defined frequency achieves control over which of the outlet branches 31, 32 the cooling gas G (the main mass flow) flowing in the inlet branch 2 is routed into. For example, depending on the phase angle at the control supply lines 51, 52, the cooling gas is routed into one or the other of the outlet branches 31, 32. The cooling gas is switched back and forth between the two outlet branches 31, 32. Numerous design variants for a control of this type are possible here.

Supplying a periodic and relatively small controlling mass flow generates a periodic high-amplitude on/off behaviour of the main mass flow in both outlet branches 31, 32. A pulsed impingement jet P with periodic on/off behaviour at a frequency f of high amplitude is thus formed in both outlet branches 31, 32. Accordingly, an on/off jet is provided at the outlet openings 8 of the two outlet branches 31, 32. This is achieved without the main cooling mass flow G having to be periodically interrupted, and in particular without active interrupter actuators having to be used or a fluctuating high-amplitude supply of the main cooling mass flow G being necessary.

The amplitude of the on/off jet provided at the outlet openings 8 is disengaged from the amplitude of the controlling mass flow applying at the control supply lines 51, 52.

An impingement jet P is emitted at each of the two outlet openings 8 of the two outlet branches 31, 32. Each impingement jet P has during its "on" phases a mean outflow velocity u with which it exits the outlet opening 8. If d is the diameter of the outlet opening 8 of the respective outlet branch 31, 32, and f the frequency of the on/off jet, then the Strouhal number Sr is determined from these parameters as follows:

$$Sr = f * d/u.$$

The parameters of frequency f, diameter d of the outlet opening 8 and mean outflow velocity u are here set such that the Strouhal number Sr is between 0.26 and 2.0. The Strouhal number is preferably in the range between 0.8 and 1.2. With these values for the Strouhal number, the on/off-pulsed impingement jet P automatically generates annular swirls 7, shown schematically in FIG. 1, after leaving the outlet opening 8.

FIG. 2 shows a first exemplary embodiment in which fluidic switching elements 1, as described with reference to FIG. 1, are used to obtain an impingement cooling configuration in a turbomachine. The impingement cooling configuration is for example provided inside a cavity of a turbine component. The switching elements 1 generate, as described with reference to FIG. 1, a pulsed impingement jet P with periodic on/off behaviour of a frequency f and high amplitude in the respective outlet branches 31, 32, with the impingement jet P generating annular swirls 7.

The impingement cooling configuration of FIG. 2 includes a partition wall 11 having two parallel surfaces 111, 112. A plurality of fluidic switching elements 1 in accordance with FIG. 1 is provided in the partition wall 11 in a linear arrangement. The fluidic switching elements 1 can here be arranged in the form of a one-dimensional or two-dimensional array.

The arrangement of the fluidic switching elements 1 in the partition wall 11 is such that the respective inlet opening 21 of the inlet branch 2 is in the plane of the one surface 111, and the respective outlet opening 8 of the outlet branches 31, 32 is in the plane of the other surface 112. The cooling gas G is supplied from the side of the surface 111. The controlling mass flow S is provided by a unit 53 which is for example a compressor, a turbine, a resonator (e.g. Helmholtz resonator) or a low-amplitude actuator.

The impingement cooling configuration furthermore has, at a distance from the partition wall 11, an impingement wall 12 to be cooled. The impingement wall 12 has a surface 121 impacted by the annular swirls 7 generated by the switching elements 1. The annular swirls 7 provide a high cooling effectivity, since the periodic occurrence of the annular swirls 7 leads to a periodic renewal of the fluid and temperature boundary layer on the surface 121.

The partition wall 11 and the wall 12 to be cooled are generally arranged curved relative to one another, i.e. their corresponding surfaces 112, 121 are each curved. This is not illustrated in the schematic representation of FIG. 2. However, other embodiments are also possible, for example an angled or parallel arrangement of the partition wall 11 and the wall 12 to be cooled.

A cooling air duct 13, via which the cooling air is removed after impacting the surface 121 to be cooled, is located between the partition wall 11 and the wall 12 to be cooled.

FIG. 2 shows further fluidic control elements 1', which differ from the fluidic switching elements 1 in that one-sided control is provided. To do so, the fluidic switching element 1' has not two, but only one control supply line 51. The functional principle is such that without the controlling mass flow, the cooling gas G would always be routed into one of the outlet branches 31, 32 (monostable state). It is achieved by the controlling mass flow that the cooling gas is periodically diverted to the other of the outlet branches.

In design variants, the impingement cooling configuration has only switching elements 1 with two-sided control, only switching elements 1' with one-sided control, or both switching elements 1, 1' with one-sided and with two-sided control.

FIG. 3 shows a modification of the impingement cooling configuration of FIG. 2 where the outlet branches 31, 32 of the fluidic switching element 1 that adjoin the branching point 4 leave the partition wall 11 at an angle not equal to 90°. The two outlet branches 31, 32 are for example each designed in a straight line here. This leads to areas 121a of the surface 121 to be cooled being subjected to both the pulsed impingement jet P of the one outlet branch 32 of a fluidic element 1 and the pulsed impingement jet P of an outlet branch 31 of an adjacent fluidic switching element 1. This leads to a doubling of the impact frequency of the annular swirls, since the areas 121a are subjected to annular swirls of adjacent fluidic switching elements 1 with phased impacts.

FIG. 4 shows a modification of the described impingement cooling configuration in which the fluidic switching elements 1 are designed for achieving high frequencies f in the range of more than 10 kHz in the pulsation of the impingement jet P. To do so, the switching element 1 has in the area of the branching point 4 two lateral lobes 41, 42 symmetrically below the inlet of the control supply lines 51, 52. Inside the lobes 41, 42, some of the cooling gas G supplied via the inlet branch 2 is routed back in circular manner, thereby allowing switchover to be achieved more easily and quickly. Fluidic switching elements of this type are known from U.S. Pat. No. 3,434,487 A. Lateral feedback lobes of this type can be provided regardless of the form of the outlet branches 31, 32 and regardless of whether the control is two-sided or one-sided.

FIG. 5 shows an example of application where an impingement cooling configuration of the type described is used for the cooling of a casing and/or lining of the turbine 100 of a jet engine. In accordance with the sectional representation of FIG. 1, the turbine 100 has stators 110 and rotors 120. A circumferential casing 130 is provided that delimits a flow duct 140 through the turbine 100 radially outwards. A lining element in the form of an insert ring 150 (also referred to as "liner") is arranged towards the flow duct 140 on the circumferential casing 130 and adjoining the rotor 120. An insert ring 150 of this type is used to minimize the annular gap between the tip of the rotor 120 and the casing 130. Alternatively, the casing 130 can however also be designed without an insert ring 150 of this type.

On that side of the casing 130 facing away from the flow duct 140, an impingement cooling configuration 160 is provided that has several fluidic switching elements 1. The impingement wall is formed in this exemplary embodiment by the casing 130 or its surface facing away from the flow duct 140. The controlling mass flow is for example made available by using turbine- or compressor-generated fluctuations.

The impingement cooling configuration is for example designed such that the diameter d of the outlet openings of the fluidic switching elements 1 is 1.4 mm. The mean outflow velocity is 17 m/s. The frequency f of the pulsation of the impingement jet is 10 kHz. The control frequency for switching of the fluidic switching element is, depending on the model, between 10 and 100 kHz. These values result in a Strouhal number of 0.82. Hence the impingement jet periodically generates annular swirls achieving a high cooling effectivity when cooling the casing 130 and the insert ring 150.

The present invention is restricted in its design not to the exemplary embodiments presented above, which must be understood merely as examples. In particular, the fluidic switching elements can be designed in a different way, for example having more than two outlet branches and/or being switched in a different way. Furthermore, the arrangement of the fluidic switching elements in a one- or two-dimensional array, for example, must be understood merely as an example. The impingement wall can be part of any inner or outer wall of a component of a turbomachine.

What is claimed is:

1. An apparatus for cooling, comprising:
   an impingent surface to be cooled;
   a partition wall arranged at a distance from the impingement surface, the impingement surface and partition wall shaped to be complementary to one another to form a generally uniform cooling air duct therebetween;
   at least one fluidic switching element positioned in the partition wall and including:
      an inlet branch with an inlet opening via which cooling gas can be supplied to the fluidic switching element,
      at least two outlet branches provided downstream of the inlet branch and ending each in an outlet opening,
      a branching point at which the inlet branch splits into the at least two outlet branches, and
      a control mechanism for controlling the cooling gas flowing in the inlet branch such that the cooling gas is routed alternatingly into the one or the other of the outlet branches, with an impingement jet pulsating at a frequency being generated in each outlet branch,
   the fluidic switching element being configured for emitting cooling gas at the outlet openings with a mean outflow velocity and a frequency such that the impingement jet exiting the outlet openings forms annular swirls directed to pass through the cooling air duct to impact the impingement surface, the cooling air duct being open between the at least two outlet branches from the partition wall to the impingement surface.

2. The apparatus in accordance with claim 1, wherein the control mechanism includes at least one control supply line to the fluidic switching element and supplies a periodically fluctuating controlling mass flow via the at least one control supply line to the fluidic switching element.

3. The apparatus in accordance with claim 2, wherein the control mechanism includes two control supply lines to the fluidic switching element and provides a two-sided control where the controlling mass flow is supplied via the two control supply lines to the fluidic switching element.

4. The apparatus in accordance with claim 2, wherein the control mechanism includes one control supply line to the fluidic switching element and provides a one-sided control where the controlling mass flow is supplied via the one control supply line to the fluidic switching element.

5. The apparatus in accordance with claim 1, wherein a ratio between the frequency of the pulsating impingement jet, the mean outflow velocity of the cooling gas from the outlet openings and a diameter of the outlet openings is such that a Strouhal number formed with these values according to a formula $Sr=f*d/u$ is in a range between 0.2 and 2.0.

6. The apparatus in accordance with claim 5, wherein the Strouhal number formed with the values according to the formula $Sr=f*d/u$ is in a range between 0.8 and 1.2.

7. The apparatus in accordance claim 1, wherein the at least two outlet branches of the fluidic switching element are curved.

8. The apparatus in accordance with claim 1, wherein the at least two outlet branches of the fluidic switching element are straight.

9. The apparatus in accordance with claim 1, wherein the branching point includes two feedback lobes inside which part of the cooling gas is routed back in a direction of the inlet branch instead of flowing into one of the outlet branches.

10. The apparatus in accordance with claim 1, wherein the apparatus includes a plurality of fluidic switching elements arranged as a one- or two-dimensional array.

11. The apparatus in accordance with claim 1, and further comprising two fluidic switching elements arranged adjacent to one another, with two outlet branches of these adjacently arranged fluidic switching elements aligned with one another such that annular swirls with double frequency are present at a defined distance from the fluidic switching elements.

12. A turbomachine including the apparatus in accordance with claim 1, wherein the impingement surface is part of the turbomachine and the at least one fluidic switching element is arranged in the turbomachine such that the annular swirls formed by the impingement jet exiting the outlet openings of the fluidic switching element impact the impingement surface.

13. The turbomachine in accordance with claim 12, wherein the turbomachine is a turbine and the impingement surface is that of a casing, or a casing liner of the turbine.

14. The turbomachine in accordance with claim 12, wherein the impingement surface is a rear face of an insert ring arranged in an area of a rotor of a turbine on a circumference of a turbine casing.

15. A method for creating an impingement jet generating annular swirls, comprising:
   providing an impingement surface to be cooled;
   providing a partition wall arranged at a distance from the impingement surface, the impingement surface and partition wall shared to be complementary to one another to form a generally uniform coding air duct therebetween;

providing at least one fluidic switching element positioned in the partition wall;

supplying cooling gas to the at least one fluidic switching element alternatingly to at least two outlet branches of the fluidic switching element, generating in each outlet branch an impingement jet pulsating at a frequency, the impingement jet forming annular swirls after leaving the fluidic switching element directed to pass through the cooling air duct to impact the impingement surface, the cooling air duct being open between the at least two outlet branches from the partition wall to the impingement surface.

* * * * *